United States Patent
Mohan et al.

(10) Patent No.: US 9,585,227 B2
(45) Date of Patent: *Feb. 28, 2017

(54) DISTRIBUTED LIGHT FIXTURE BEACON MANAGEMENT

(71) Applicant: enLighted, Inc., Sunnyvale, CA (US)

(72) Inventors: Tanuj Mohan, Mountain View, CA (US); Gaile Gordon, Palo Alto, CA (US)

(73) Assignee: enLighted, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,497

(22) Filed: Apr. 2, 2016

(65) Prior Publication Data

US 2016/0219676 A1 Jul. 28, 2016

Related U.S. Application Data

(63) Continuation-in-part of application No. 14/549,830, filed on Nov. 21, 2014, now Pat. No. 9,345,115, which is a continuation-in-part of application No. 13/691,562, filed on Nov. 30, 2012, now Pat. No. 8,994,295, which is a continuation-in-part of application No. 12/874,331, filed on Sep. 2, 2010, now Pat. No. 8,587,225, which is a
(Continued)

(51) Int. Cl.
*H05B 37/02* (2006.01)
*G01S 5/00* (2006.01)
*G01S 5/16* (2006.01)

(52) U.S. Cl.
CPC ........ *H05B 37/0218* (2013.01); *G01S 5/0027* (2013.01); *G01S 5/16* (2013.01); *H05B 37/0227* (2013.01); *H05B 37/0245* (2013.01); *H05B 37/0272* (2013.01); *Y02B 20/46* (2013.01)

(58) Field of Classification Search
CPC ..... G01S 5/0027; G01S 5/16; H05B 37/0218; H05B 37/0227; H05B 37/0245; H05B 37/0272; Y02B 20/46
See application file for complete search history.

(56) References Cited

U.S. PATENT DOCUMENTS

| | | |
|---|---|---|
| 5,101,141 A | 3/1992 | Warner et al. |
| 5,179,324 A | 1/1993 | Audbert |
| 5,191,265 A | 3/1993 | D'Aleo et al. |

(Continued)

*Primary Examiner* — Alexander H Taningco
*Assistant Examiner* — Kurtis R Bahr
(74) *Attorney, Agent, or Firm* — Brian R Short

(57) ABSTRACT

Apparatuses, methods, apparatuses and systems for a light fixture are disclosed. One apparatus of the light fixture includes a sensor unit and a light intensity controller. The sensor unit includes a sensor operative to generate a sense signal base on at least one of sensed motion or light, wireless communication circuitry operative to maintain a link with a network, and a controller. The controller is operative to manage communication with the network, manage reception of beacons through the wireless communication circuitry, wherein the beacons are received from an object, and the beacons include information associated with the object, and generate dimming control base on at least one of the sensed signal and communication from the network. The light intensity controller is configured to receive the dimming control and operative to adjust an emitted light intensity of a luminaire of the light fixture.

20 Claims, 14 Drawing Sheets

Related U.S. Application Data continuation-in-part of application No. 12/584,444, filed on Sep. 5, 2009, now Pat. No. 8,457,793.

(56) References Cited

U.S. PATENT DOCUMENTS

| | | |
|---|---|---|
| 5,283,516 A | 2/1994 | Lohoff |
| 5,812,422 A | 9/1998 | Lyons |
| 6,057,654 A | 5/2000 | Cousy et al. |
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |
| 7,348,736 B2 | 3/2008 | Piepgras et al. |
| 7,382,271 B2 | 6/2008 | McFarland |
| 7,437,596 B2 | 10/2008 | McFarland |
| 7,550,931 B2 | 6/2009 | Lys et al. |
| 7,566,137 B2 | 7/2009 | Veskovic |
| 7,623,042 B2 | 11/2009 | Huizenga |
| 7,792,956 B2 | 9/2010 | Choong et al. |
| 7,812,543 B2 | 10/2010 | Budike, Jr. |
| 7,925,384 B2 | 4/2011 | Huizenga et al. |
| 8,368,321 B2 | 2/2013 | Chemel et al. |
| 9,006,996 B2 | 4/2015 | Mohan et al. |
| 9,345,115 B2 * | 5/2016 | Mohan ................ G01S 5/0027 |
| 2004/0002792 A1 | 1/2004 | Hoffknecht |
| 2005/0169643 A1 | 8/2005 | Franklin et al. |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2008/0185977 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2009/0267540 A1 * | 10/2009 | Chemel .................. F21S 9/043 315/297 |
| 2010/0026479 A1 * | 2/2010 | Tran .................. A61B 5/0006 340/501 |
| 2010/0034386 A1 | 2/2010 | Choong et al. |
| 2010/0135186 A1 | 6/2010 | Choong et al. |
| 2010/0264846 A1 | 10/2010 | Chemel et al. |
| 2010/0270933 A1 | 10/2010 | Chemel et al. |
| 2010/0280677 A1 | 11/2010 | Budike, Jr. |
| 2010/0295482 A1 | 11/2010 | Chemel et al. |
| 2010/0301773 A1 | 12/2010 | Chemel et al. |
| 2011/0031897 A1 | 2/2011 | Henig et al. |
| 2011/0199020 A1 | 8/2011 | Henig et al. |
| 2013/0293877 A1 | 11/2013 | Ramer et al. |
| 2014/0285095 A1 | 9/2014 | Chemel et al. |

\* cited by examiner

Receiving, by the light fixture, a broadcast message from a central server, wherein reception of the broadcast message puts the light fixture into a known condition

910

Establishing communication between the light fixture and the user

920

Communicating, by either the light fixture or the user, a location of the user at a time of the established communication, to the central server, thereby allowing the central server to record the location

DISTRIBUTED LIGHT FIXTURE BEACON MANAGEMENT

RELATED APPLICATIONS

This patent application is a continuation-in-part (CIP) of U.S. patent application Ser. No. 14/549,830, filed Nov. 21, 2014, which is a continuation-in-part (CIP) of U.S. patent application Ser. No. 13/691,562, filed Nov. 30, 2012, which is a continuation-in-part (CIP) of U.S. patent application Ser. No. 12/874,331 filed Sep. 2, 2010, which is a continuation-in-part (CIP) of U.S. patent application Ser. No. 12/584,444 filed Sep. 5, 2009, which are herein incorporated by reference.

FIELD OF THE EMBODIMENTS

The described embodiments relate generally to lighting. More particularly, the described embodiments relate to distributed light fixture beacon management.

BACKGROUND

Lighting control systems automate the operation of lighting within a building or residence based upon, for example, preset time schedules and/or occupancy and/or daylight sensing. The Lighting systems typically employ occupancy sensors and/or daylight sensors to determine which lighting devices to activate, deactivate, or adjust the light level of, and when to do so. Occupancy sensors typically sense the presence of one or more persons within a defined area and generate signals indicative of that presence. Daylight sensors typically sense the amount of daylight present within a defined area and generate signals indicative of that amount. Typically, lighting systems receive the sensor signals at a central lighting controller.

The lighting systems are advantageous because they typically reduce energy costs by automatically lowering light levels or turning off devices and appliances when not needed, and they can allow all devices in the system to be controlled from one location.

Centrally controlled lighting systems can be disadvantageous because all decision making occurs at the controller. Therefore, if the controller becomes inoperative, all lighting devices in the system are no longer under automated control and some or all may not operate even manually. Similarly, if a connection to or from the controller is severed, the lighting devices served by that connection are no longer under automated control and also may not operate manually. Partial or system-wide functional changes, such as an immediate need to override current system settings (for example, during a fire or other emergency), cannot be made from anywhere but the controller. Additionally, centrally-controlled systems are limited in their ability to be scaled. That is, it is not easy to add new lighting devices to a centrally-controlled system.

Decentralized lighting systems address many of the above-described issues. However, decentralized lighting systems require commissioning of lighting devices associated with the lighting systems.

Commissioning is the process of configuring the lighting system. This includes configuring the initial settings on these lighting devices, and obtaining and storing information about the physical location of the devices and their role in the lighting control topology.

It is desirable to have a method, system and apparatus for distributed light fixture beacon management.

SUMMARY

One embodiment includes a light fixture. The light fixture includes a sensor unit and a light intensity controller. The sensor unit includes a sensor operative to generate a sense signal base on at least one of sensed motion or light, wireless communication circuitry operative to maintain a link with a network, and a controller. The controller is operative to manage communication with the network, manage reception of beacons through the wireless communication circuitry, wherein the beacons are received from an object, and the beacons include information associated with the object, and generate dimming control base on at least one of the sensed signal and communication from the network. The light intensity controller is configured to receive the dimming control and operative to adjust an emitted light intensity of a luminaire of the light fixture.

Another embodiment includes a method of operating a light fixture. The method includes generating, by a sensor of the light fixture, a sense signal base on at least one of sensed motion or light, maintaining a communications link between the light fixture and a network, managing communication with the network, managing manage reception of beacons through the wireless communication circuitry, wherein the beacons are received from an object, and the beacons include information associated with the object, generating dimming control base on at least one of the sensed signal and communication from the network, and adjusting a dimming control line of a luminaire of the light fixture based on the dimming control.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 9 is a flow chart that includes steps of a method of commissioning a light fixture, according to an embodiment.

DETAILED DESCRIPTION

Figure 1:
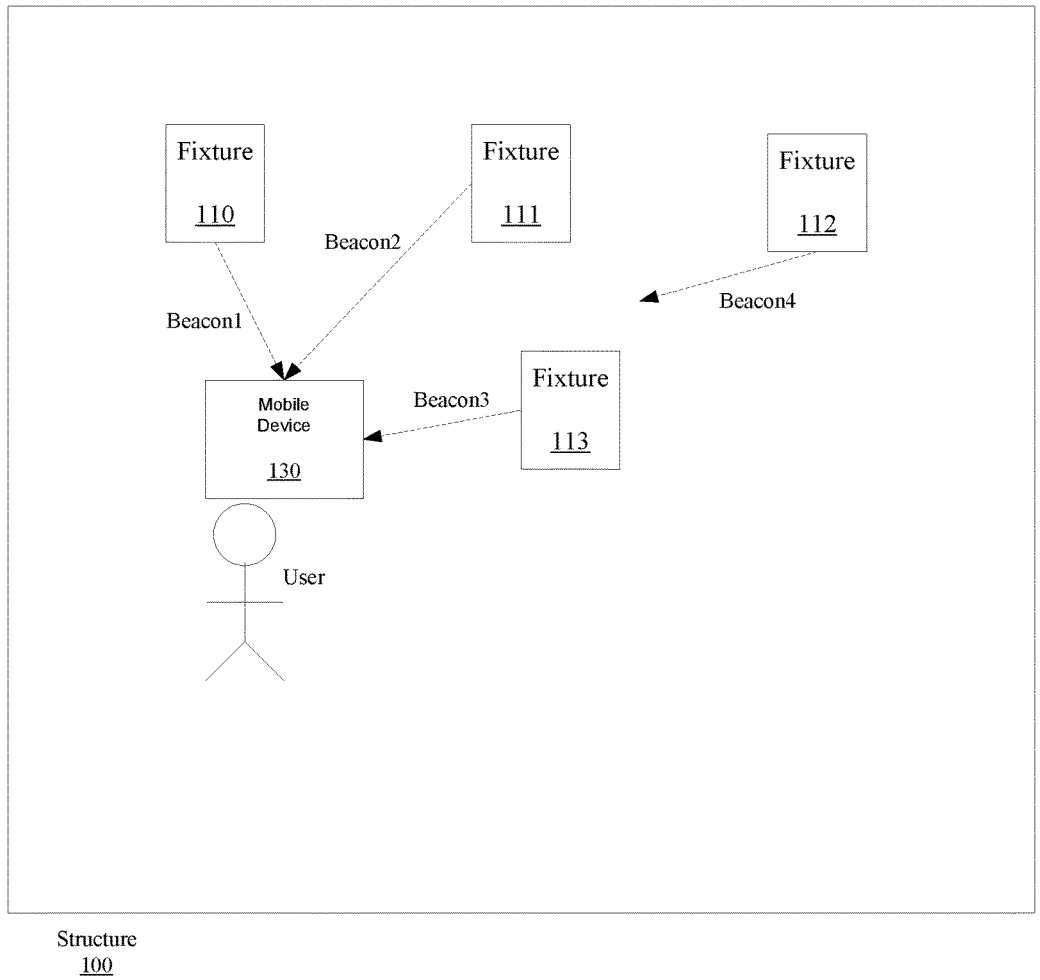
FIG. 1 shows a plurality of light fixtures that transmit beacons that are received by a mobile device, according to an embodiment.

As shown in the drawings, the described embodiments are embodied in an apparatus and method for distributed light fixtures that transmit beacons for reception by an object, or for the distributed light fixtures receiving beacons from the object. For an embodiment, the transmission of the beacons is utilized for location determination of the mobile device and/or the light fixtures.

FIG. 1 shows a plurality of light fixtures that transmit beacons that are received by a mobile device 130, according to an embodiment. More specifically, a subset (110, 111, 113) of the light fixtures 110, 111, 112, 113 transmit beacons that are received by the mobile device 130. The mobile device 130 receives the beacons, and utilizing at least some information included within the beacons, the mobile device 130 estimates at least one of its own location and/or a location of one or more of the light fixtures within a structure 100.

For an embodiment, a power level of signals transmitted from the light fixtures is limited to be less than a threshold. By limiting the power level of the transmitted signals, the distance at which the transmitted signals can be received from a mobile device 130 is limited. For example, for an embodiment, the transmitted signal includes low-power Bluetooth® wireless signals. Due to the transmitted signal being low-power, the mobile device 130 only receive beacons from a light fixture if the mobile device 130 is within a limited range. For an embodiment, the power level of the transmitted signals is set to be at or lower than a threshold amount to ensure that the mobile device is within a specified range of a light fixture in order for the mobile device to receive transmitted beacons. For example, as previously described and shown in FIG. 1, the mobile device 130 may receive beacons transmitted from the light fixtures 110, 111, 113, but may not receive beacon from the fixture 112 because the mobile device 130 is out of range of the fixture 112.

For at least some embodiment, the beacons include identification information that uniquely identifies that light fixture that transmitted the beacon. For an embodiment, the beacons include location information that includes location information of the transmitting light fixture. Based on the identification information and/or the location information of the transmitted light fixture, the mobile is able to estimate its own location, or the location of the light fixture that transmitted a received beacon.

For at least some embodiments, the light fixtures 110, 111, 112, 113 manage the transmission of the beacons. For an embodiment, the light fixtures 110, 111, 112, 113 manage transmission of the beacons by only transmitting beacons upon the light fixtures 110, 111, 112, 113 sensing motion. That is, for example, each of the light fixtures 110, 111, 112, 113 only transmits beacons when sensing motion of, for example, the user and the mobile device 130. This advantageously saves power consumed by the light fixtures 110, 111, 112, 113 because the light fixtures 110, 111, 112, 113 only transmit beacons which consumes power when a user is detected through motion detection.

For another embodiment, the light fixtures 110, 111, 112, 113 only transmit beacons when a location request is received by one or more of the light fixtures 110, 111, 112, 113 from the mobile device. That is, for example, the mobile device transmits a "where am I" request. Upon receiving the request, the light fixture(s) that receives the request begin(s) transmitting beacons. Again, this embodiment saves power because beacons are only transmitted when requested, and only transmitted from light fixtures that receive the request.

Figure 2:
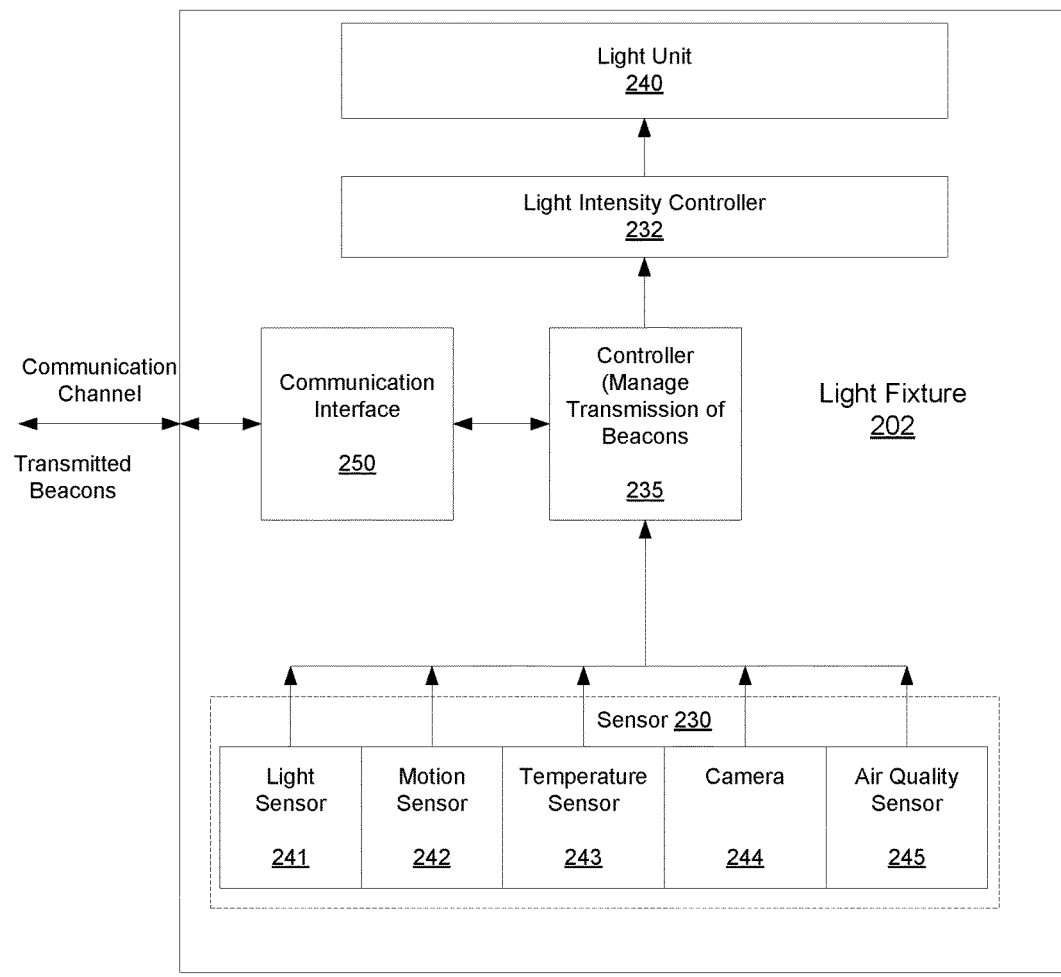
FIG. 2 shows a light fixture, according to an embodiment.

FIG. 2 shows a light fixture 202, according to an embodiment. The light fixture 202 includes a sensor unit 230 and a light intensity controller 232. The sensor unit 230 includes at least one sensor (such as, a light sensor 241, a motion sensor 242, a temperature sensor 243, a camera 244 and/or an air quality sensor 245), wherein the sensor operative to generate a sense signal base on at least one of sensed motion or light. The light fixture 202 further includes communication circuitry 250. The communication circuitry 250 is operative to maintain a link (the link can be wired or wireless) with a network. The light fixture 202 further includes a controller 235. For at least some embodiments, the controller 235 is operative to manage communication with the network, manage transmission of beacons through the communication circuitry, and generate dimming control base on at least one of the sensed signal and communication from the network. As described, for at least some embodiments, the beacons include information associated with the fixture. The light intensity controller 232 is configured to receive the dimming control and operative to adjust an emitted light intensity of a luminaire 240 of the light fixture 202.

As previously described, for at least some embodiments, the information within the transmitted beacons that is associated with the fixture includes location information of the fixture. For at least some embodiments, the information associated with the fixture includes an identifier of the fixture.

As previously described, for at least some embodiments, the sensor includes a motion sensor, and wherein managing transmission of the beacons includes triggering transmission of a beacon upon sensing motion by the motion sensor. For an embodiment, the transmission of the beacon is triggered by sensing motion of greater than a predetermined threshold. For at least some embodiments, the light fixture includes a battery, wherein the battery provides electrical power to the light fixture. The triggering of beacons under certain conditions (such as sensing motion) provides power savings over implementations that continuously transmit beacons. This is desirable for battery powered light fixtures.

For at least some embodiments, managing transmission of the beacons includes transmitting beacon continuously over time.

As previously described, for at least some embodiments, managing transmission of the beacons comprises transmitting the beacons with at a transmission signal power level of less than a threshold level, wherein the transmitted beacon cover less than predetermined area. By limiting the power level of the transmitted beacons, the range or distance away from a light fixture in which the mobile device 130 can receive beacons is limited. Therefore, as a first approximation, the location of the mobile device can be assumed to be the location of the light fixture that transmitted the beacon. As the mobile device received beacons from multiple light fixtures, the estimated location of the mobile device can be improved. For an embodiment, the beacons are transmitted using a low-power Blue Tooth transceiver.

As previously described, for at least some embodiments, a plurality of other light fixtures transmit beacons at a transmission signal power level of less than the threshold, enabling a mobile device to receive beacons from the light fixture and the other light fixtures and estimate a location of the mobile device, wherein estimating the location of the mobile device includes measuring a receive signal strength of the received beacons, estimating a distance between the mobile device and the light fixture and between the mobile device and each of the other light fixtures, and estimating the location by triangulating the estimated distances. For at least some embodiments, each of the light fixture and the other light fixtures transmit the beacons after sensing motion, thereby limiting how many light fixtures transmit beacons.

As previously described, for at least some embodiments, managing the transmission of beacons includes receiving a location request from a mobile device, and responding with transmission of one or more beacons. For at least some embodiments, the transmitted beacons include a location of the light fixture, and wherein the mobile device determines its location based on the location information of the light fixture. For at least some embodiments, the transmitted beacons include an identifier of the light fixture, and wherein the mobile device determines its location by determining a location of the light fixture based on the identifier. For example, for an embodiment, the mobile device accesses the location based on the identified and known location(s) of the light fixture(s). At least some embodiments further include supplementing the location determination with RSSI (receive signal strength indicator) measurements between the mobile device and the light fixture.

For at least some embodiments, the light fixture is further operative to receive a broadcast message from a central controller, wherein reception of the broadcast message puts the light fixture into a known condition, wherein putting the light fixture in the known condition communicates to a user that the light fixture is prepared for commissioning, establishing, through the managed transmission of the beacons, communication between the light fixture and a mobile device of the user, and communicating, by either the light fixture or the mobile device, a location of the user at a time of the established communication, to the central controller, thereby allowing the central controller to record a location of the light fixture.

Figure 3:
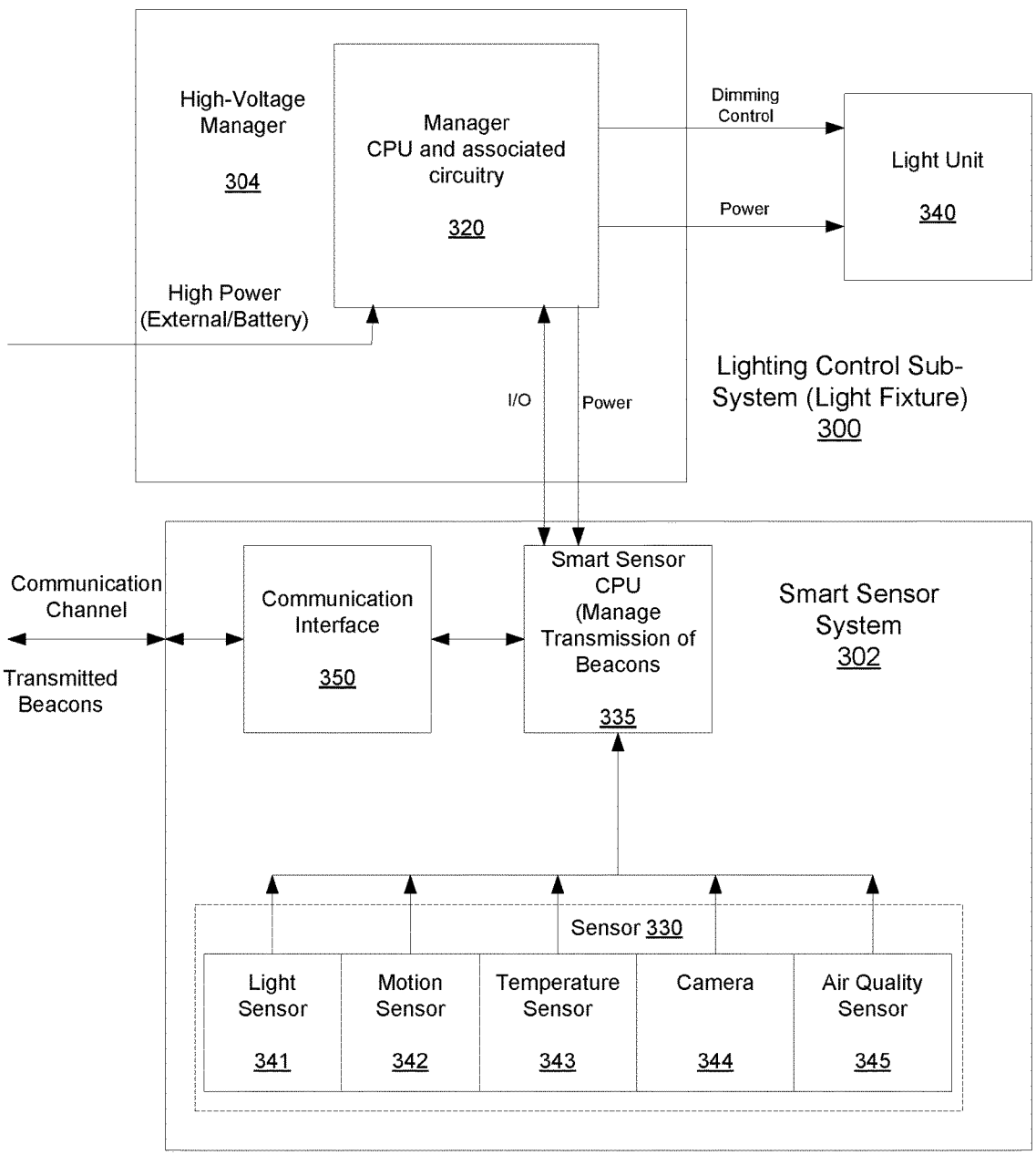
FIG. 3 shows a light fixture, according to another embodiment.

FIG. 3 shows a light fixture, according to another embodiment. The exemplary light fixture 300 (which could alternatively by referred to as lighting control subsystem because of the multiple controls) includes a smart sensor system 302 that is interfaced with a high-voltage manager 304, which is interfaced with a luminaire 340. The high-voltage manager 304 includes a controller (manager CPU) 320 that is coupled to the luminaire 340, and to a smart sensor CPU 335 of the smart sensor system 302. As shown, the smart sensor CPU 335 is coupled to a communication interface 350, wherein the communication interface 350 couples the controller to an external device. The smart sensor system 302 additionally includes a sensor 330. As indicated, the sensor 330 can include one or more of a light sensor 341, a motion sensor 342, and temperature sensor 343, a camera 344 and/or an air quality sensor 345. It is to be understood that this is not an exhaustive list of sensors. That is additional or alternate sensors can be utilized for lighting and/or environmental control of a structure that utilizes the lighting control sub-system 300. The sensor 330 is coupled to the smart sensor CPU 335, and the sensor 330 generates a sensed input. For at least one embodiment, at least one of the sensors is utilized for communication with the mobile device.

According to at least some embodiments, the controllers (manager CPU 320 and the smart sensor CPU 335) are operative to control a light output of the luminaire 340 based at least in part on the sensed input, and communicate at least one of state or sensed information to the external device.

For at least some embodiments, the high-voltage manager 304 receives the high-power voltage and generates power control for the luminaire 340, and generates a low-voltage supply for the smart sensor system 302. As suggested, the high-voltage manager 304 and the smart sensor system 302 interact to control a light output of the luminaire 340 based at least in part on the sensed input, and communicate at least one of state or sensed information to the external device. The high-voltage manager 304 and the smart sensor system 302 can also receive state or control information from the external device, which can influence the control of the light output of the luminaire 340. While the manager CPU 320 of the high-voltage manager 304 and the smart sensor CPU 335 of the smart sensor system 302 are shown as separate controllers, it is to be understood that for at least some embodiments the two separate controllers (CPUs) 320, 335 can be implemented as single controller or CPU.

For at least some embodiments, at least one of the (CPUs) 320, 335 manage the transmission of the beacons.

For at least some embodiments, the communication interface 350 provides a wireless link to external devices (for example, the central controller, the mobile device and/or other lighting sub-systems or devices). Further, for an embodiment, the communication interface 350 provides a means for the (CPUs) 320, 335 to control the transmission of the beacons.

An embodiment of the high-voltage manager 304 of the lighting control sub-system 300 further includes an energy meter (also referred to as a power monitoring unit), which receives the electrical power of the lighting control sub-system 300. The energy meter measures and monitors the power being dissipated by the lighting control sub-system 300. For at least some embodiments, the monitoring of the dissipated power provides for precise monitoring of the dissipated power. Therefore, if the manager CPU 320 receives a demand response (typically, a request from a power company that is received during periods of high power demands) from, for example, a power company, the manager CPU 320 can determine how well the lighting control sub-system 300 is responding to the received demand response. Additionally, or alternatively, the manager CPU 320 can provide indications of how much energy (power) is being used, or saved.

Figure 4:
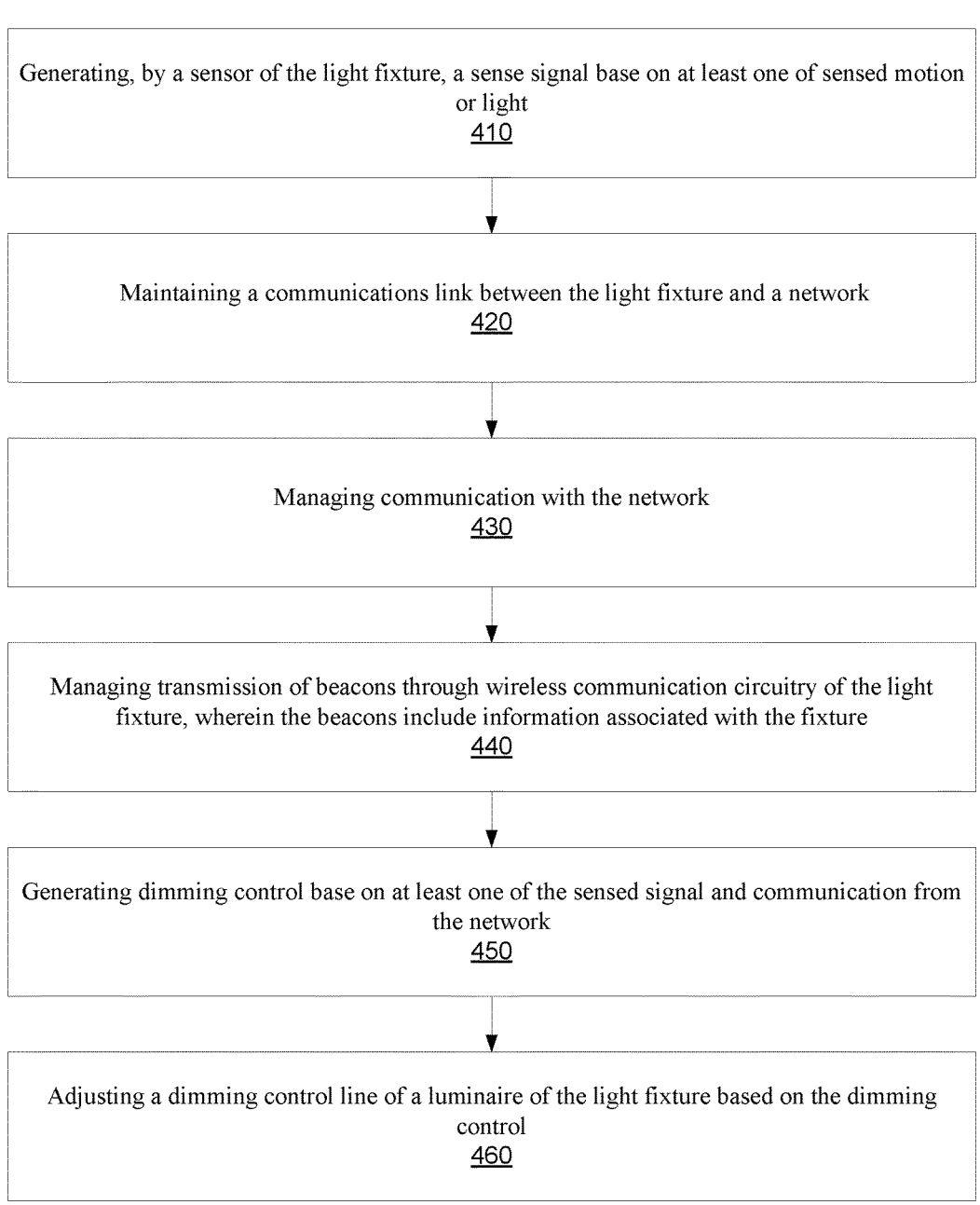
FIG. 4 is a flow chart that includes steps of a method of controlling a light fixture, according to an embodiment.

FIG. 4 is a flow chart that includes steps of a method of controlling a light fixture, according to an embodiment. A first step 410 includes generating, by a sensor of the light fixture, a sense signal base on at least one of sensed motion or light. A second step 420 includes maintaining a communications link between the light fixture and a network. A third step 430 includes managing communication with the network. A fourth step 440 includes managing transmission of beacons through wireless communication circuitry of the light fixture, wherein the beacons include information associated with the fixture. A fifth step 450 includes generating dimming control base on at least one of the sensed signal and communication from the network. A sixth step 460 includes adjusting a dimming control line of a luminaire of the light fixture based on the dimming control.

For at least some embodiments, the sensor includes a motion sensor, and wherein managing transmission of the beacons comprises triggering transmission of a beacon upon sensing motion by the motion sensor.

For at least some embodiments, managing transmission of the beacons comprises transmitting the beacons with at a transmission signal power level of less than a threshold level, wherein the transmitted beacon cover less than predetermined area.

For at least some embodiments, a plurality of other light fixtures transmit beacons at a transmission signal power level of less than the threshold, enabling a mobile device to receive beacons from the light fixture and the other light fixtures and estimate a location of the mobile device, wherein estimating the location of the mobile device comprises measuring a receive signal strength of the received beacons, estimating a distance between the mobile device and the light fixture and between the mobile device and each of the other light fixtures, and estimating the location by triangulating the estimated distances.

For at least some embodiments, each of the light fixture and the other light fixtures transmit the beacons after sensing motion, thereby limiting how many light fixtures transmit beacons.

For at least some embodiments, managing the transmission of beacons includes receiving a location request from a mobile device, and responding with transmission of one or more beacons, wherein the transmitted beacons include a location of the light fixture, and wherein the mobile device determines its location based on the location information of the light fixture.

Figure 5:
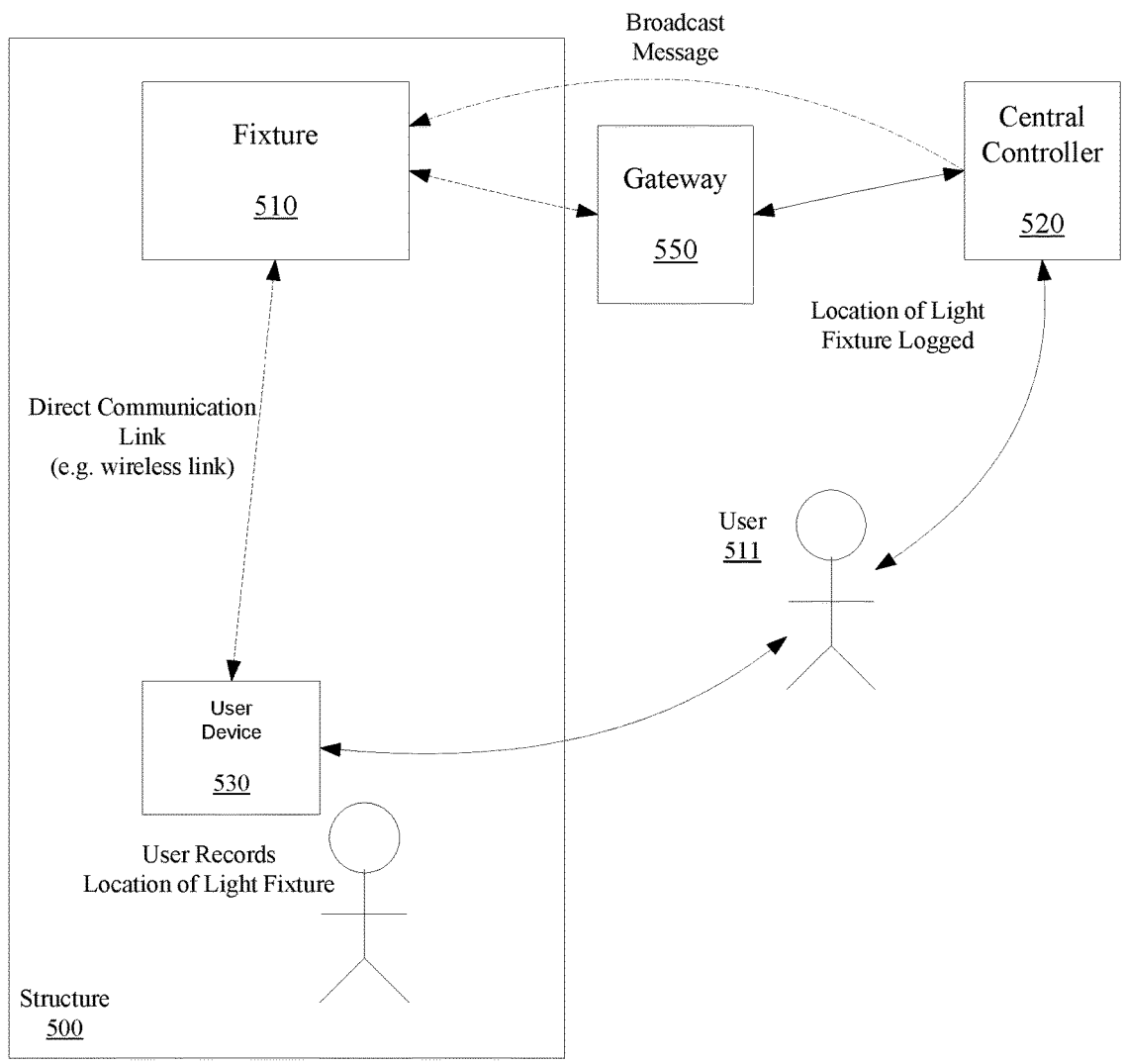
FIG. 5 shows a user commissioning a light fixture of a lighting control system, according to an embodiment.

FIG. 5 shows a user commissioning a light fixture 510 of a lighting control system, according to an embodiment. For at least some embodiments, a user travels about a structure 500 and communicates (through a mobile device 530) with light fixtures (such as, light fixture 510) within the structure. The user or the mobile device 530 identifies a location of the mobile device 530 at the time the mobile device 530 or the user is communicating with the light fixtures. For at least some embodiments, during communication with the light fixture 510, the user and the mobile device 530 are located physically proximate to the light fixture 510. Therefore, a location of the light fixture 510 can be approximated by the location of the user and/or the mobile device 530. Once determined or approximated, the location of the light fixture 510 can be communicated to a central controller 520, wherein the central controller 520 logs the location of the light fixture 510 for future reference.

The described embodiments include various different embodiments of the central controller. For an embodiment, the central controller is a standalone server. For another embodiment, the central controller is a mobile device that can be carried and transported by the user. For yet another embodiment, the central controller is a mobile device that can be carried by the user, and additionally synchronized to another central controlling device. For another embodiment, the gateway 550 and central controller 520 are combined in a single device that includes the functionality of both. For another embodiment, the central controller is included within one or more of the fixtures. That is, the controller can be included within a single fixture, or the functionality of the controller can be distributed among controllers within multiple of the fixtures.

For at least some embodiments, the commissioning process begins with the central controller 520 broadcasting a message that is received by one or more light fixtures, such as, light fixture 510. As shown, for an embodiment, the central controller 520 communicates with the light fixture 510 through a gateway 550. The communication channel between the central controller 520 and the gateway 550 can be wired or wireless. For an embodiment, the communication channel is an Ethernet connection. Further, the communication channel between the gateway 550 and the light fixture can be wired or wireless. Note for other embodiments, the commissioning process can be initiated by the fixture themselves.

For an embodiment, reception of the broadcast puts the light fixture 510 into a predetermined or known mode of operation. For an embodiment, reception of the broadcast message puts the light fixture 510 in the known condition, thereby communicating to the user that the light fixture 510 is prepared for commissioning. Once ready for commissioning, communication between the user or the mobile device 530 and the light fixture 510, can be completed. For an embodiment, reception of the broadcast message causes the light fixture 510 to power cycle and dim, and further, to report a sensed light levels corresponding with the power cycling.

When the light fixture 510 is prepared for communication, the mobile device 530 establishes communication with the light fixture. For an embodiment, the communication is initiated by a light emitting device of the user that generates pulses (strobes) of light. A light sensor of the light fixture 510 sensing the pulsing light, and then communicates back to the user 511 that communication from the user 511 has been received. For an embodiment, the light fixture 510 communicates to the user with a visible (such as a light) indicator. While this embodiment include communicating between the mobile device 530 (or user) being accomplished through light, it is to be understood that any method of communication can be used, including, but not limited to audio, motion and/or electromagnetic communication. The communication provides a means for establishing the location of the light fixture based on a location of the user/mobile device.

Once the location of the light fixture 510 has been determined or estimated, the location of the light fixture 510 is communicated to the central controller 520. For an embodiment, the user physically enters the location into the central controller 520. For another embodiment, the mobile device 530 automatically updates the central controller 520. For another embodiment, the light fixture 510 obtains its location information, and updates the central controller. For another embodiment, the central controller 520 and the mobile device 530 are the same device which automatically updates its own light fixture data base.

The location information can be determined in a number of ways. The user may know where he/she is located within the structure. For an embodiment, the mobile device 530 includes a global positioning system (GPS) receiver and automatically determines its location. For at least some embodiments, the mobile device 530 determines its location by triangulating received radio frequency (RF) signal from, for example, WiFi routers located proximate to the mobile device 530. By knowing the locations of the WiFi routers, the mobile device can approximate its location based on the know locations and a received signal strength of the RF signals of the WiFi routers.

Figure 6:
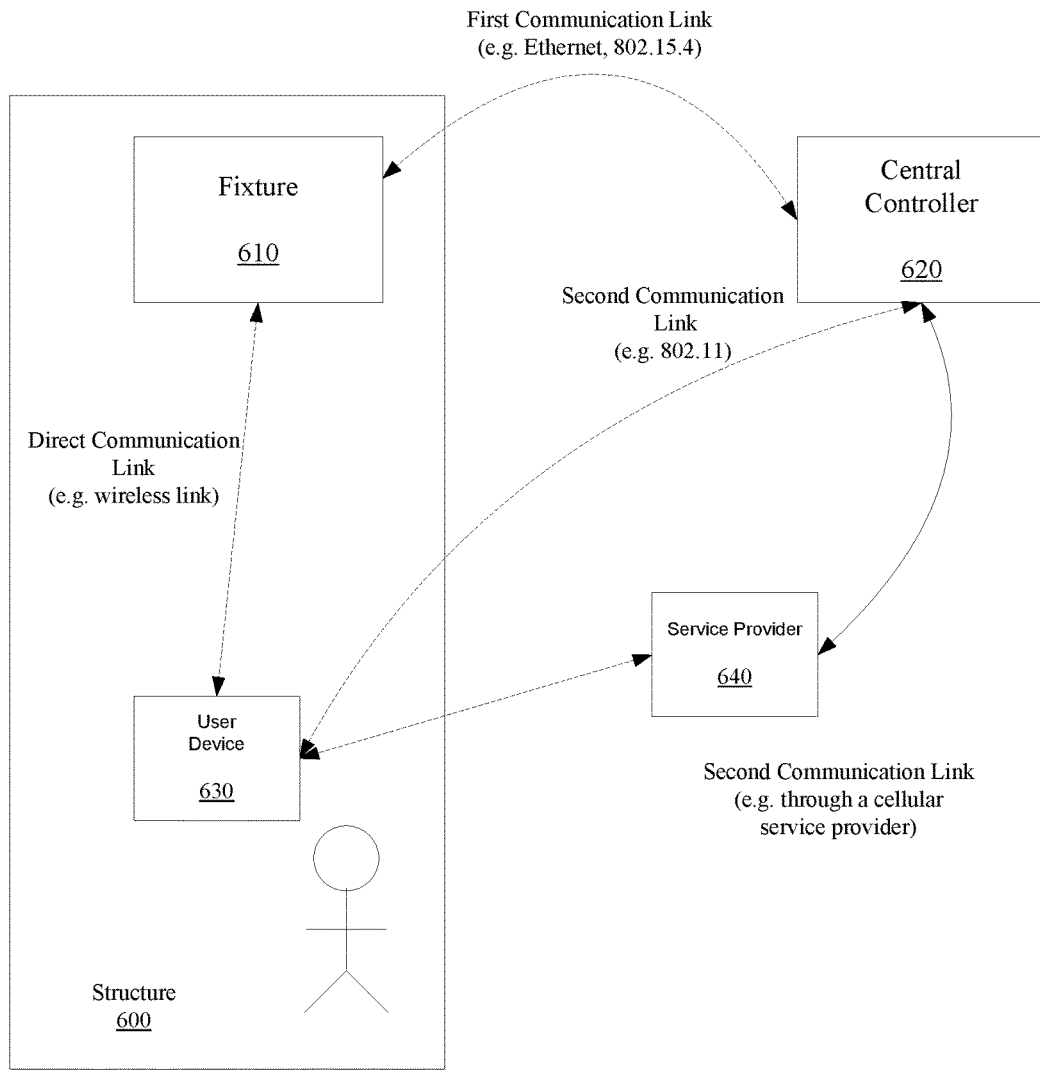
FIG. 6 shows a user commissioning a light fixture of a lighting control system, according to another embodiment.

FIG. 6 shows a user commissioning the light fixture 610 of a lighting control system of a structure 600, according to another embodiment. For this embodiment, a first communication link is established between the central controller 620 and the light fixture 610, and a second communication link is established between the mobile device 630 and the central controller 620. For an embodiment, the second communication link includes a direct WiFi (802.11) wireless link. For another embodiment, the second communication link includes an indirect link through a service provider 640.

That is, for example, the mobile device 630 can establish a wireless (such as, cellular) link to the service provider 640. The service provider 640 is then network connected to the central controller 620.

Figure 7:
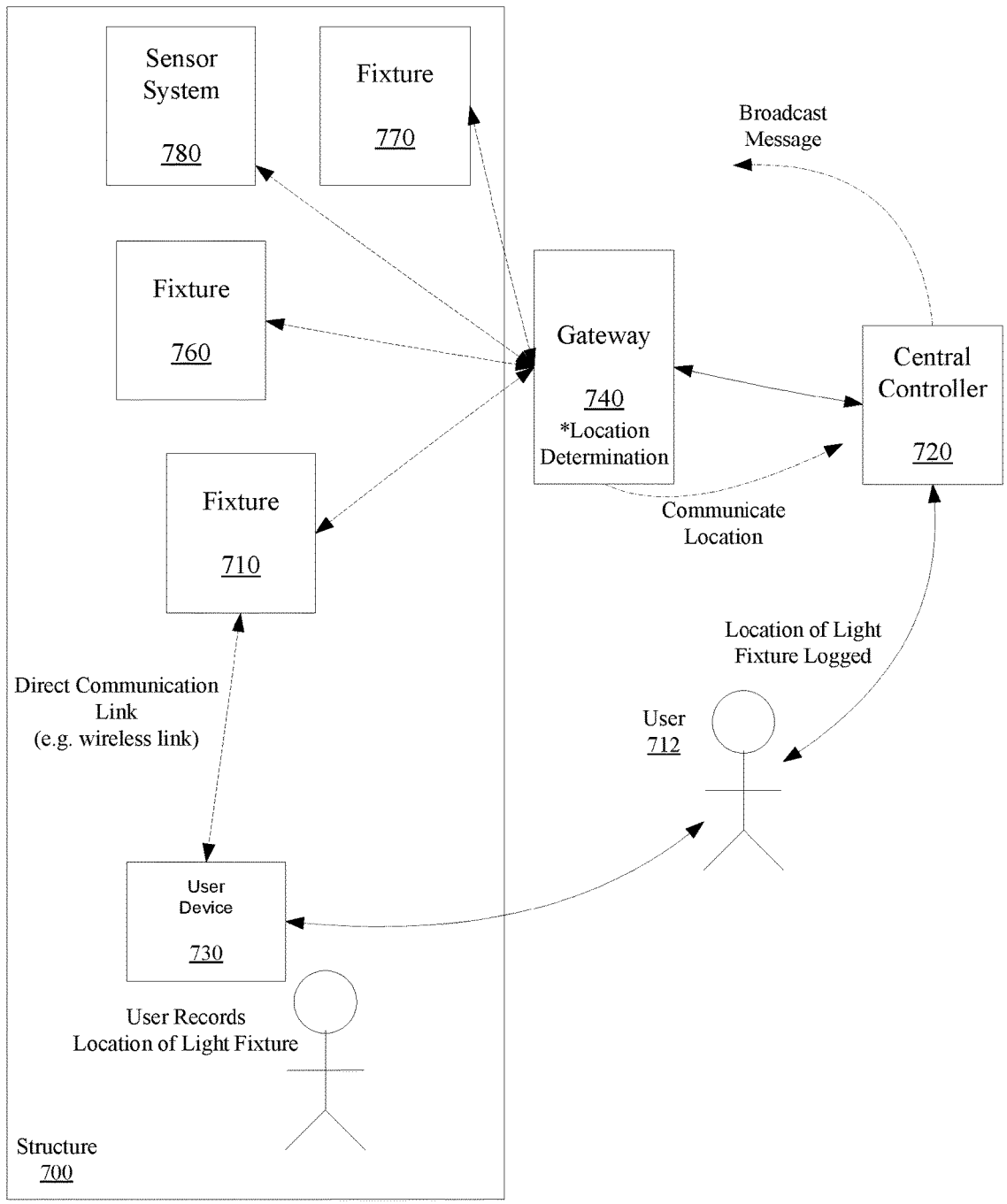
FIG. 7 shows a commissioning a gateway of a lighting control system, according to an embodiment.

FIG. 7 shows a commissioning a gateway of a lighting control system, according to an embodiment. The embodiments for commissioning a light fixture can be extended to further include commissioning of other devices of the lighting system, such as, gateways (such as, gateway 740), sensors (such as, sensor system 780), which can themselves by standalone devices, and switches.

For an embodiment, the gateway includes a simple pass through device that just converts from one communication medium to the other. For a specific embodiment, the gateway converts messages from the IEEE 802.15.4 standard to the IEEE 802.11 standard.

For various embodiments, the switches include any of one or more control devices, such as, a wall switch, a desktop remote, a cell phone or tablet.

As shown in FIG. 7, several light fixtures 710, 760, 770 can determine their location utilizing the described embodiments. Further, the light fixtures 710, 760, 770 are in communication with, for example, a gateway 740. For at least some embodiments, after the light fixtures 710, 760, 770 and/or sensor system 780, have determined their location, the light fixtures 710, 760, 770 and/or sensor system 780, transmit wireless messages that include their determined location. The gateway 740 receives the wireless messages, and is able to approximate its location by triangulating based on the locations of the light fixtures 710, 760, 770. That is, based on a received signal strength (RSSI) of the received wireless signals, the gateway 740 can approximate its distance from each of the light fixtures 710, 760, 770. Further, based on the location of each light fixture 710, 760, 770 and/or sensor system 780, included within the received wireless messages, the gateway 740 can approximate its own location.

While FIG. 7 only shows a single gateway 740, other embodiments include any number of gateways. The embodiments for location determination can be used for commissioning the gateways. Further, embodiments include gateway discovery, wherein the central controller provides one or more gateways with IP addresses. Further, for at least some embodiments, the location determination of each of the gateways includes each gateway notifying the central controller when the gateway has received a message from at least one light fixture, wherein the message received from the at least one light fixture indicates that the at least one light fixture has received communication from the user, wherein the central controller determines the location of the gateway based on the location of the light fixture.

Alternatively, or additionally, other lighting system devices can be commissioned, and determine their location as well.

As shown, for an embodiment, the gateway 740 is network connected to a central controller 720. Further, as previously described, for at least some embodiments, a mobile (user) device 730 establishes a link to the light fixture 710. Further, for at least some embodiments, the user 712 logs locations of light fixtures of a structure 700 with the central controller 720.

The sensor system 780 (which can be an embodiment of the smart sensor system 202 of FIG. 2) can be utilized to provide additional information. For example, unlike the light fixtures 710, 760, 770, the sensor system can be strategically located within a structure. For example, the sensor system 780 may include a temperature sensor. By locating the sensor system 780 at a location within the structure that more closely approximates the temperature within the structure where occupants are located, the temperature sensed by the sensor system 780 more accurately represents the temperature that the occupants are subject to. That is, the light fixtures 710, 760, 770 are typically located on a ceiling of the structure which does not allow for an accurate representation of the temperature within the structure that occupants are experiencing.

Figure 8:
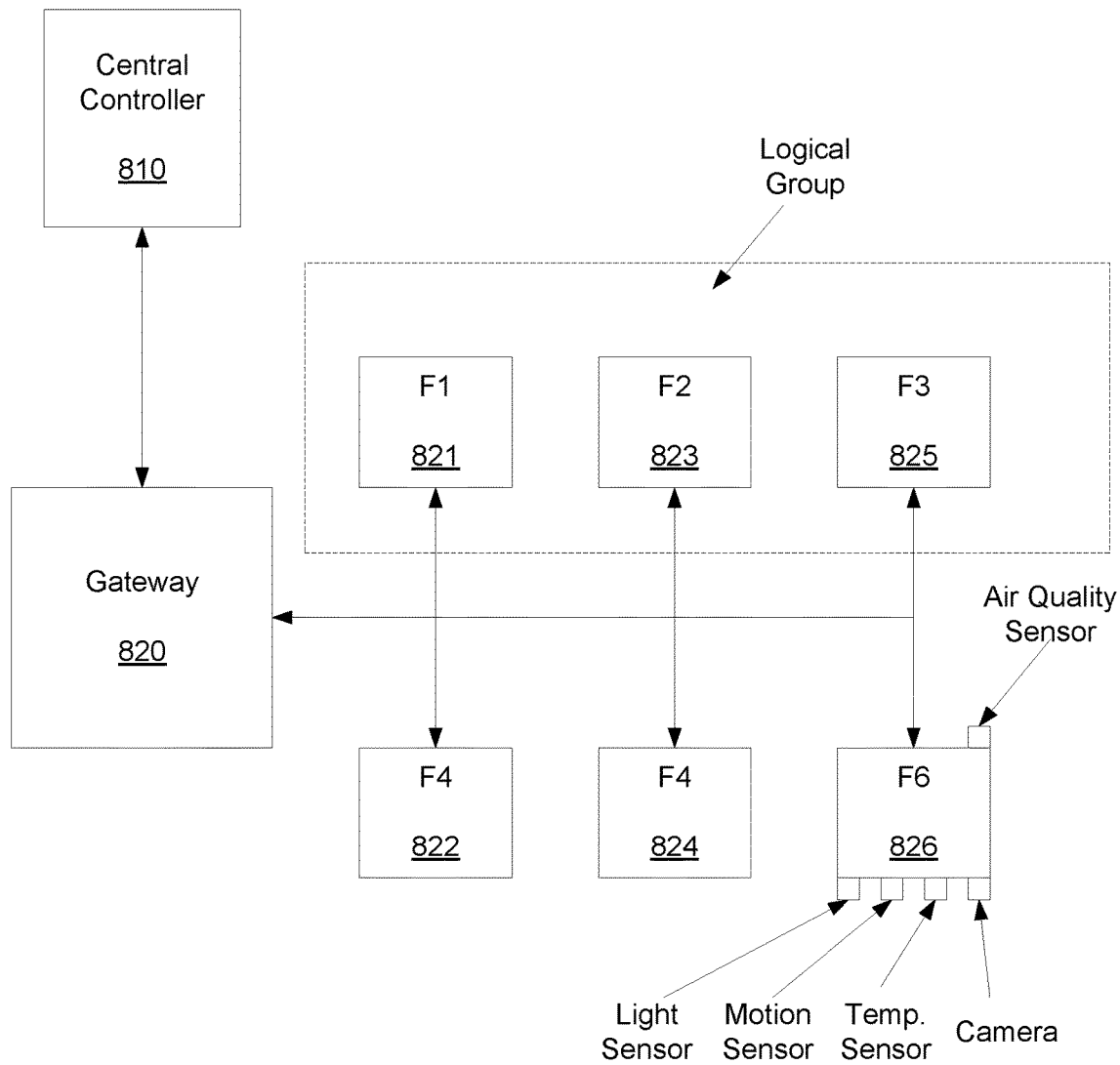
FIG. 8 shows a distributed lighting control system that includes that includes a logical group of light fixtures and a central controller, according to an embodiment.

FIG. 8 shows a distributed lighting control system that includes that includes a logical group of light fixtures 821, 822, 823, 824, 825, 826 and a central controller 810, according to an embodiment. As described, for an embodiment, the central controller 810 can communicate with the light fixtures 821, 822, 823, 824, 825, 826 through a gateway 820. At least some embodiments of the lighting control system include a plurality of the lighting control sub-system (each lighting control sub-system can include a light fixture). Each of the lighting control sub-systems can operate independently, in coordination with other lighting control sub-systems (for example, existing hard-wired systems), and/or in coordination with a central controller. As such, each of the lighting control sub-systems can be independently installed, and adapt their operation accordingly.

As shown, the light fixtures 821, 822, 823, 824, 825, 826 can be organized, or they can organize themselves into logical groups. Once included as a part of a logical group, a light fixture can be controlled based on state or sense information of other light fixtures within the logical group. Additionally, the logical group can be commonly controlled. For an embodiment, at least one of the logical groups includes a motion sensing group. For an embodiment, at least one of the logical groups includes an ambient light group. For an embodiment, at least one of the logical groups includes a logical switch group. For an embodiment, at least one of the logical groups includes a logical temperature group. Further, logical groups can be defined by attributes of a structure in which the light fixtures are located. For example, light fixture located within a hallway of a structure may be grouped, light fixtures within a conference room, a bath room or a storage room may be grouped into logical groups.

During commissioning, the logical groups can be auto-assigned based on information, like location, that is determined during commissioning. Group attributes can be selected based on location and type (like corridor, office). Based on the maps and known locations, logical groups can be intelligently and automatically allocated. Further, logical group formations can be influenced by the locations of the light fixtures determined during commissioning.

As previously stated, an embodiment of the lighting control sub-system includes a communication interface, a controller (listed in discussion as a single controller, but as previously described, at least some embodiment include multiple controllers, such as, the high-voltage manager 204 and the smart sensor CPU 235), a luminaire, a light sensor, and a motion sensor. For an embodiment, the luminaire is a lighting unit consisting of one or more lamps, socket(s) and parts that hold the lamp(s) in place and protect them, wiring that connects the lamp(s) to a power source, and reflector(s) to help direct and distribute the light. Various embodiments of luminaires include bulb technologies, such as incandescent, florescent, and LED (light emitting diode). Further, various embodiments of the luminaires are controllably turned on and off, and further, are controllably dimmable.

For at least some embodiments, the controller makes decisions as to turning on, turning off, and dimming the luminaires. The controller does this, for example, either due to command from an external device (such as, the central controller), or by processing decision rules using inputs from the sensors, a saved configuration, time of day, passage of time from past sensor inputs, and/or from state or sensor values from other sub-systems. Additionally or alternatively, learned behavior can influence the decisions.

For at least some embodiments, the sensors sense (or measures) some physical quantity and converts it into a digital value. For an embodiment, the sensors are packaged together with the controller. More specifically, for various embodiments of the lighting control sub-system, multiple sensors of the lighting control sub-system include a motion sensor, a light sensor, and temperature sensors located in the same physical module, which is connected to the other physical modules with a cable. For an embodiment, the sensor(s) are physically located beside the luminaire, and the motion and light sensors are directed towards the floor of a structure in which the lighting control sub-system is located. For an embodiment, the sensor(s) are directly connected to the controller.

For an embodiment, the controller is further operative to receive information from an external device, wherein the received information influences a current state of the lighting control sub-system, or the received information includes parameters that influence a future state of the lighting control sub-system. For an embodiment, the received information influences a lighting control sub-system profile. For an embodiment, the lighting sub-system profile includes a set of values (parameters) that affect the operation of the controller in determining how it controls the light output of the luminaire based on current and past sensor inputs, time of day or passage of time. For at least some embodiments, the parameters are adaptively updated.

For at least some embodiments, the controller is operative to receive a plurality of lighting control sub-system profiles. That is, there can be more than one lighting control sub-system profile, and the lighting control sub-system profiles can be adaptively updated. More specifically, an active profile or present profile of the plurality of lighting control sub-system profiles can be adaptively updated. Further, for at least some embodiments, the external device can add, replace or delete one or more profiles of the plurality of lighting control sub-system profiles.

FIG. 9 is a flow chart that includes steps of a method of commissioning a light fixture, according to an embodiment. A first step 910 includes receiving, by the light fixture, a broadcast message from a central controller, wherein reception of the broadcast message puts the light fixture into a known condition. A second step 920 includes establishing communication between the light fixture and a user. A third step 930 includes communicating, by either the light fixture or the user, a location of the user at a time of the established communication, to the central controller, thereby allowing the central controller to record a location of the light fixture.

As described, for an embodiment, putting the light fixture in the known condition communicates to the user that the light fixture is prepared for commissioning. The communication to the user can be visual, audible, or communicated to the user by any means available.

An embodiment further includes initiating diagnostics of the lighting system of the light fixture. That is, different lighting system devices can communicate with each other over different communication channels. Through this communication, the lighting system devices can run diagnostics to test, for example, that all the electrical wiring has been done correctly, the sensors are working correctly and the controllable systems (lights, etc.) are responding correctly.

For an embodiment, the light fixture is a part of a lighting system that includes other lighting system devices, such as, gateways and switches. An embodiment further includes determining a communication link quality between the light fixture and one or more lighting system devices. An embodiment further includes estimating a location of at least one of the lighting system devices based on the location of the light fixture and the communication link quality between the light fixture and the at least one lighting system device. An embodiment further includes estimating the location of the at least one lighting system device based on locations of a plurality of lighting fixtures, and link qualities between the at least one lighting system device and each of the plurality of lighting fixtures. That is, for example, trilateration between the lighting system device and the plurality of lighting fixtures can be used to estimate the location of the lighting system device.

An embodiment further includes discovering the one or more gateways, wherein discovery includes providing, by the central controller, the one or more gateways with IP addresses, and determining a location of each of the gateways, including each gateway notifying the central controller when the gateway has received a message from at least one light fixture, wherein the message received from the at least one light fixture indicates that the at least one light fixture has received communication from the user, wherein the central controller determines the location of the gateway based on the location of the light fixture. For an embodiment, if multiple gateways receive the message, a signal quality of the message is used to determine which of the gateways is closest to the at least one light fixture, and therefore determines the location of the gateway that is the closest.

An embodiment includes sensing, by the light fixture, a presence of a user. For an embodiment, the presence of the user is sensed through a motion sensor.

For an embodiment, establishing the communication link includes the light fixture providing the user with an indicator that the light fixture has received an initial communication from the user. For an embodiment, the communication is established between the light fixture and the user through a strobing light. For an embodiment, the communication is established between the light fixture and the user through an RF signal, such as, 802.15.4 or Zigbee.

For an embodiment, establishing the communication between the light fixture and the user includes the light fixture modulation light emitting from the fixture with information that provides identification of the light fixture. That is, for example, for an embodiment, the light fixture is operative to modulate light emitted from the light fixture with information that uniquely identifies the light fixture. For example, the information can include a MAC (media access control) address or an IP (internet protocol) address of the light fixture. The user can have a mobile device in the user's possession that demodulates the modulated light, thereby providing the mobile device with the identification information of the light fixture. This information along with the location information of the light fixture can be communicated to the central controller, thereby allowing the central controller to log the identification information of the light fixture along with the location information of the light fixture.

An embodiment further includes the user communicating the location of the light fixture directly to the central controller. This communication can be one or more of several different forms. For an embodiment, the user directly enters the location information to the central controller. For another embodiment, the user communicates (for example, via mobile device to mobile device through either a cellular or WiFi network) the location information to a second user who manually enters the location. For an embodiment, the user wirelessly communicates the location information through a network that is connected to the central controller. Again, the wireless communication can be cellular or WiFi. As previously described, for an embodiment, the mobile device and the central controller are the same device. For another embodiment, the light fixture communicates the location of the light fixture directly to the central controller.

As previously described, an embodiment includes a plurality of other light fixtures automatically determining their location based on the location of the light fixture. That is, once locations of several light fixtures have been determine, these light fixtures and their location can be used to allow other fixtures to automatically determined their own locations based off of the reception of messages from the known-location light fixtures. For example, the other light fixtures can triangulate based on estimated distances between the other light fixtures and the known-location fixtures. The messages include the location of the known-location fixture, and the distance can be estimated based on the received signal strength of the messages.

An embodiment further includes a plurality of light fixtures, wherein each light fixture automatically establishing communication between the light fixture and the user as the user travels in a structure that includes the plurality of light fixtures, wherein each light fixture automatically determines its location based on the established communication. That is, for example, a user can merely "walk around" a structure. The light fixtures automatically communicate with a mobile device. The location of the mobile device can be automatically communicated to the light fixtures, allowing each light fixture to estimate their location. GPS within the mobile device can be used to determine the location of the user. The communication links between the mobile device and each light fixture can be established when the mobile device is within a predetermined proximate distance of the light fixture.

Maps or floor plans of a structure in which the light fixtures are located can be utilized to aid the automatic location determination and grouping process. The maps can be photos or graphical illustrations of the floor plan which highlight relative locations of the light fixtures. The mapped locations can be used to make the trilateration process more accurate. Once the location is determined through trilateration, a "snap-to-grid" process can be utilized to align the estimated location to the known fixture locations. The maps and determined locations can also be used to provide more information about space within the structure, for example, whether a space is an office, hallway, open area, etc.

Lighting Fixture Reception of Beacons

Figure 10:
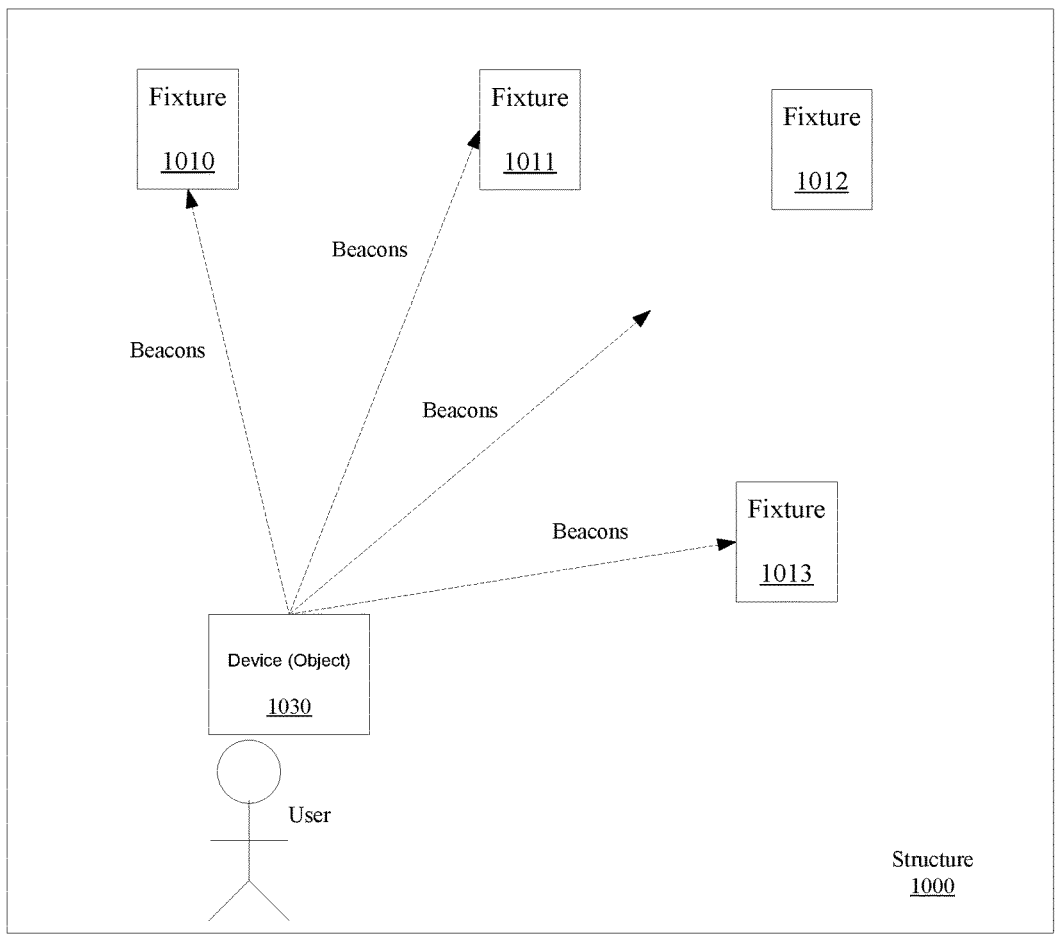
FIG. 10 shows a plurality of light fixtures that receive beacons that are transmitted by a mobile device, according to an embodiment.

FIG. 10 shows a plurality of light fixtures 1010, 1011, 1012, 1013 within a structure 1000 that receive beacons that are transmitted by a device (also referred to as an object, or as a mobile device because for some embodiments the device is mobile) 1030, according to an embodiment. While at least some of the described embodiments include light fixtures transmitting beacons, at least some embodiments alternatively or additionally include one or more lighting fixtures receiving beacons from one or more devices.

As shown, a device (object) 1030 transmits beacons that are received by at least a subset of the light fixtures 1010, 1011, 1013. The light fixtures receive the beacons, and utilizing at least some information included within the beacons, one or more of the light fixtures manage the received beacons.

For an embodiment, a power level of signals transmitted from the device (object) 1030 is limited to be less than a threshold. By limiting the power level of the transmitted signals, the distance at which the transmitted signals can be received by the light fixtures is limited. For example, for an embodiment, the transmitted signal includes low-power Bluetooth® wireless signals. Due to the transmitted signal being low-power, one or more of the light fixtures only receive beacons from the device (object) 1030 if the device (object) 1030 is within a limited range (distance) from the one or more light fixtures. For an embodiment, the power level of the transmitted signals is set to be at or lower than a threshold amount to ensure that the device (object) 1030 is within a specified range (distance) of a light fixture in order for the light fixture to receive transmitted beacons. For example, the light fixtures 1010, 1011, 1013 may receive beacons transmitted from the device 1030, but the fixture 1012 may not receive a beacon because the device 1030 is out of range of the fixture 1012.

For at least some embodiments, one or more light fixture is operative to determine a received signal strength indicator (RSSI) of the received beacons, wherein the information associated with the object includes at least transmission power of the beacons, and wherein the one or more controllers associated with one or more light fixtures is operative (either locally and/or by a central or external controller) to estimate a distance between the light fixture and the object based on the RSSI of the received beacons and the transmission power of the beacons.

For at least some embodiment, the beacons include identification information that uniquely identifies the device (object) 1030 that transmitted the beacon. For at least some embodiments, the information associated with the object includes at least one of a transmission power of the beacons, a unique ID of the object, remaining battery power of the object, or manufacturer ID, device model, or communication protocol version.

In some environments there may be devices transmitting beacons which are not managed by the fixture. For at least some embodiments, the unique ID, a portion of the unique ID, or the manufacturer ID can be used to filter or ignore some received beacons. Filtering the received beacons based on manufacturer ID can have an advantage that filtering can be done without querying a database of unique ID data. Such a database would either require memory space on the controller, or take time to query if it were stored in a separate controller.

For at least some embodiments, the information associated with the object includes sensed motion of the object. That is, motion of the object is sensed, and information of this sensed motion is included within the beacons transmitted by the object or mobile device. For an embodiment, the sensed motion includes sensed acceleration of the object. For example, an accelerometer associated with the object senses motion or acceleration of the object. For an embodiment, a controller associated with the object includes the sensed acceleration in the beacons transmitted by the object.

For at least some embodiments, one or more controllers associated with the light fixtures are operative to detect an orientation of the object at rest based on the magnitude and direction of acceleration in a three axis coordinate system. If the device is stationary, the force of gravity acts on the accelerometer in a direction perpendicular to the ground, producing a measurement equivalent 1G, whereas the other two perpendicular directions will have acceleration close to zero. Device orientation can be valuable in interpreting RSSI in the context of an antenna that causes transmission strength to vary with orientation. If the device is rigidly attached to an object of interest which has a preferred orientation, device orientation information can be operative to indicate an alarm condition.

For at least some embodiments, the sensed acceleration of the object is used to detect if the object is moving, or stationary. Stationary objects will exhibit very little change in acceleration. The judgement of whether the object is moving can be used to influence a rate at which the device transmits the beacons. That is, for an embodiment, sensed accelerometer data is used locally at the object to control a frequency of beacon message transmission. For an embodiment, the beacon transmission rate is lower if the object is determined to be stationary which reduces power requirements. For an embodiment, when the object is determined to be moving, the beacon transmission rate is increased. For an embodiment, the device 1030 only transmits beacons when a motion sensor of the device 1030 senses motion of the device 1030. This advantageously saves power consumed by the device 1030 and the light fixtures 1010, 1011, 1012, 1013 because the device only transmits beacons and the light fixtures 1010, 1011, 1012, 1013 only receive these beacons which consumes power when a motion of the device 1030 is detected through motion detection.

For at least some embodiments, the information associated with the object includes at least one of gyroscope data, magnetometer data, temperature data, air quality measurements.

For at least some embodiments, one or more controllers associated with one or more light fixtures is operative to estimate a distance between the light fixture and the object based in part by an RSSI of the received beacons and a transmission power of the beacons, and wherein at least one of the controller and another controller is operative to estimate a location of the object based on the estimated distance. That is, for example, each of a plurality of light fixtures receives beacons and each light fixture estimates a distance between the object and the receiving light fixture. The location of the object can be estimated based on known locations of each of the receiving light fixtures, and trilateration based on the estimated distances between each receiving light fixture and the object.

RSSI (Received Signal Strength Indicator) is known to fluctuate based on multipath effects and interference with objects or structures in the area. These effects can increase the location error of trilateration location methods. Another embodiment includes alternatively, or additionally (that is, supplement other location methods) determining a location based on RSSI fingerprinting. In this approach the signal strength for a number of receivers is measured at a sampling of locations and stored. During localization (location determination), the stored values are compared to currently measured values to find the best matching location. The stored RSSI values at a given location can be to be updated as the environment changes, for instance, furniture is moved. This update process can be performed from data captured while tracking a mobile device. The tracked device will follow a connected smooth path in most cases. The most likely path can provide location data and RSSI records at sample locations on that path. These can be compared to stored RSSI fingerprints and adapted when a consistent variation has been detected over time.

For at least some embodiments, location error is reduced by restricting objects from being located in areas where travel is not possible, that is, traveling through areas where there is a wall, or in general on paths that are not navigable. For at least some embodiments, typical travel paths are learned from occupancy data which is derived from independent sensors, and from floor plan data which must be known for fixture commissioning.

These object location methods apply in the described system configurations, that is, when beacons are transmitted from fixtures and received by a mobile device, or when beacons are transmitted by a device and received by the fixtures.

For at least some embodiments, the sensed acceleration includes a magnitude and direction of acceleration of the object along one or more directions. Integration of acceleration can be used to provide estimates of velocity, and integration of velocity and be used to provide estimates of position. The error accumulates quickly however, so these estimates are used over short movements. These estimates can also be used in combination with RSSI based position estimates to reduce overall estimation error for moving targets.

Gyroscope data, which measures device rotation, and magnetometer data, which acts as a compass to measure absolute orientation, can provide very useful data for location update estimation and are often used together with accelerometer data to reduce drift or improve accuracy in position update estimates.

For an embodiment, the light fixture is further operative to sense motion, and wherein location of the object is determined only after sensing the motion. That is, for example, a motion sensor of the fixture can sense motion, which provides sensing of occupancy of a room or structure in which the light fixture is located. The one or more controllers receives the occupancy data and the received beacon data and uses the data together to produce a location estimate for the beacon. In particular, if the beacon data (sensors at the beacon, RSSI data for all sensors receiving the beacon) produces a new position estimate that corresponds to a location in which a fixture has not sensed motion will be considered a lower probability estimate compared to a location where the fixture has sensed motion.

Figure 11:
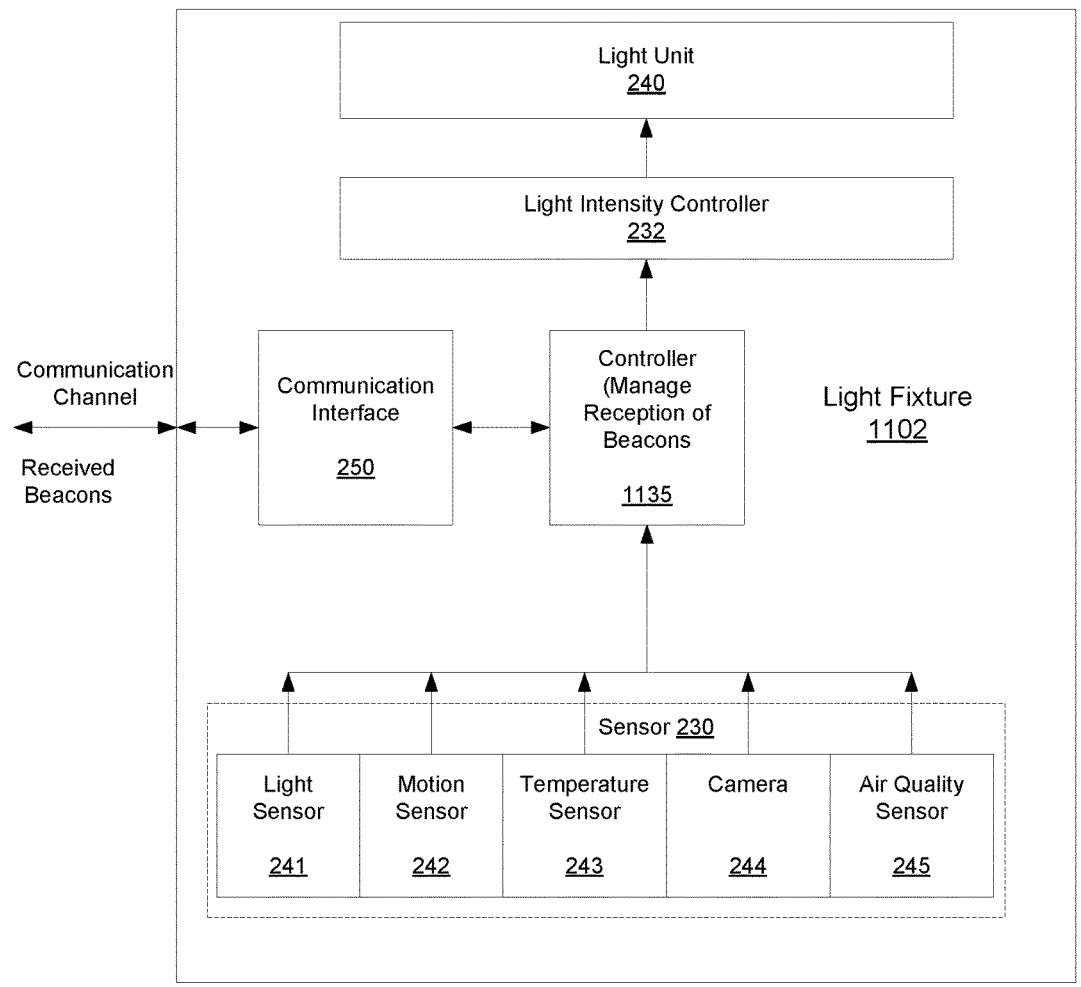
FIG. 11 shows a light fixture, according to another embodiment.

FIG. 11 shows a light fixture, according to another embodiment. This embodiment is similar to the embodiment of FIG. 2, but includes the controller 1135 of the light fixture 1102 managing the reception of beacons rather that transmission of beacons.

Figure 12:
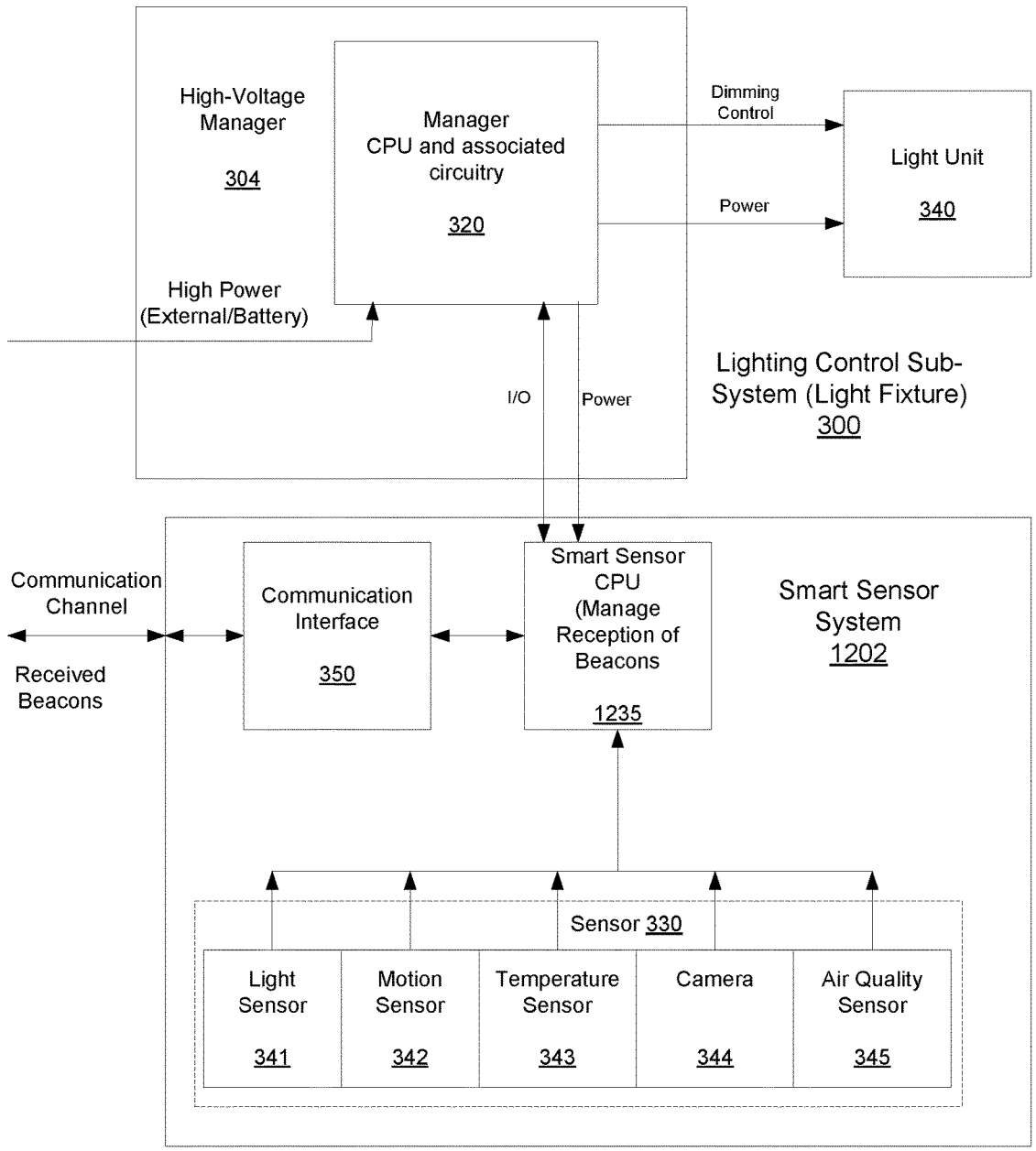
FIG. 12 shows a light fixture, according to another embodiment.

FIG. 12 shows a light fixture, according to another embodiment. This embodiment is similar to the embodiment of FIG. 3, but includes the smart sensor CPU 1235 of the smart sensor system 1202 managing the reception of beacons rather that transmission of beacons.

Figure 13:
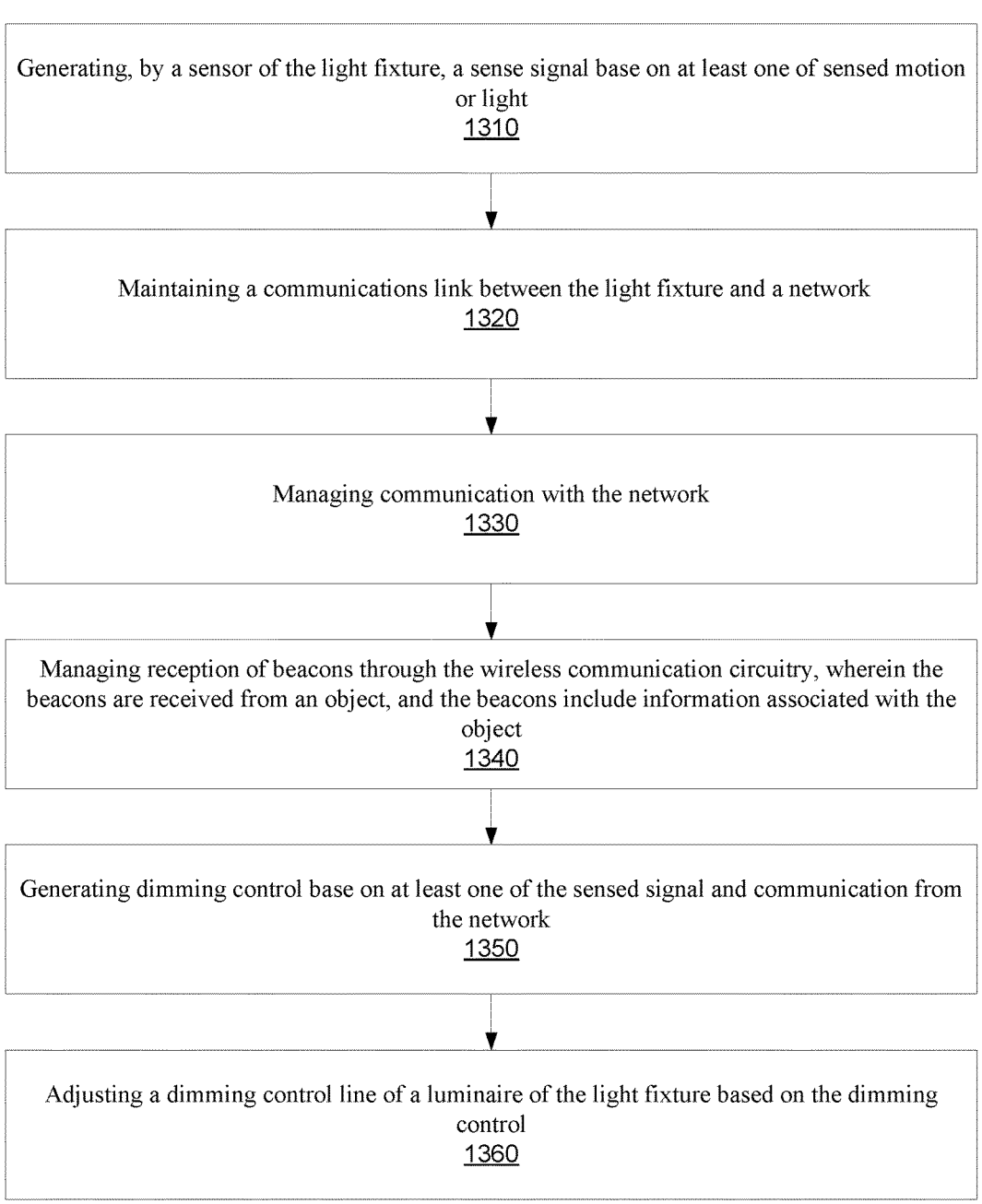
FIG. 13 is a flow chart that includes steps of a method of controlling a light fixture, according to another embodiment.

FIG. 13 is a flow chart that includes steps of a method of controlling a light fixture, according to another embodiment. A first step 1310 includes generating, by a sensor of the light fixture, a sense signal base on at least one of sensed motion or light. A second step 1320 includes maintaining a communications link between the light fixture and a network. A third step 1330 includes managing communication with the network. A fourth step 1340 includes managing manage reception of beacons through the wireless communication circuitry, wherein the beacons are received from an object, and the beacons include information associated with the object. A fifth step 1350 includes generating dimming control base on at least one of the sensed signal and communication from the network. A sixth step 1360 includes adjusting a dimming control line of a luminaire of the light fixture based on the dimming control.

As previously described, for at least some embodiments, the information associated with the object includes at least one of a transmission power of the beacons, a unique ID of the object, or remaining battery power of the object.

As previously described, for at least some embodiments, the light fixture is operative to determine a received signal strength indicator (RSSI) of the received beacons, wherein the information associated with the object includes at least transmission power of the beacons, and wherein the controller is operative to estimate a distance between the light fixture and the object based on the RSSI of the received beacons and the transmission power of the beacons.

As previously described, for at least some embodiments, the information associated with the object includes sensed motion of the object, wherein the sensed motion includes sensed acceleration of the object. For at least some embodiments, the sensed acceleration of the object influences a rate at which the object transmits the beacons.

As previously described, for at least some embodiments, estimating a distance between the light fixture and the object based on an RSSI of the received beacons and a transmission power of the beacons, and estimating a location of the object based on the estimated distance.

Figure 14:
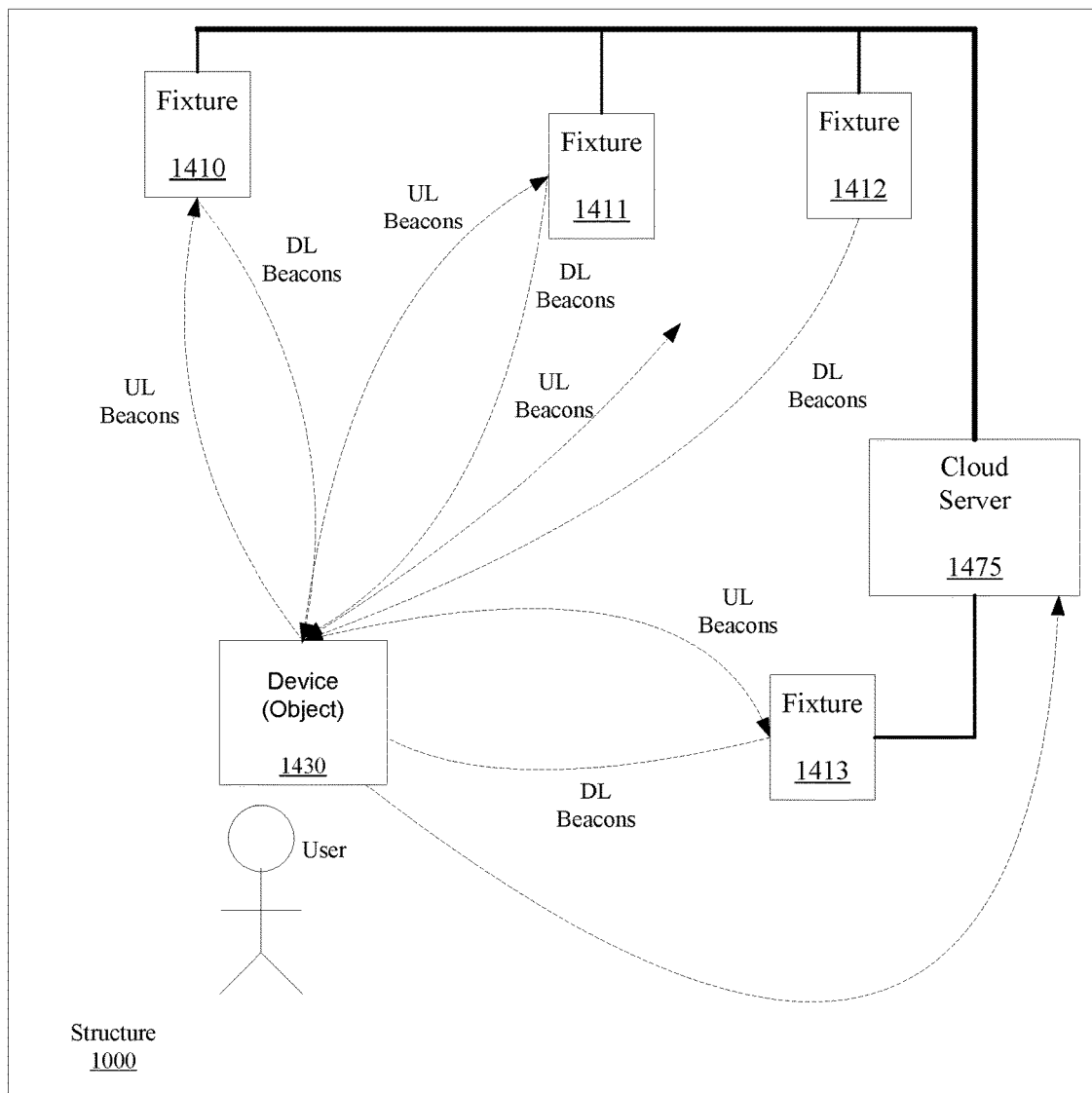
FIG. 14 shows a plurality of light fixtures that transmit beacons that are received by a device, and the plurality of fixtures receive beacons that are transmitted by the mobile device, according to an embodiment.

FIG. 14 shows a plurality of light fixtures 1410, 1411, 1412, 1413 that transmit beacons that are received by a device 1430, and the plurality of fixtures 1410, 1411, 1412, 1413 receive beacons that are transmitted by the device 1430, according to an embodiment. For example, fixture 1410 transmits downlink (DL) beacons to the device 1430 and receives uplink (UL) beacons transmitted by the device 1430. Fixture 1411 transmits downlink (DL) beacons to the device 1430 and receives uplink (UL) beacons transmitted by the device 1430. Fixture 1413 transmits downlink (DL) beacons to the device 1430 and receives uplink (UL) beacons transmitted by the device 1430. However, Fixture 1412 transmits downlink (DL) beacons to the device 1430, but does not receive uplink (UL) beacons transmitted by the device 1430 because, for example, the device 1430 is too far away from the fixture 1412. The transmission power level of beacons transmitted in one direction may be more reliably received than beacons transmitted in the opposite direction. For example, the beacons transmitted in the downlink direction may be more reliable than beacons transmitted in the uplink direction.

The bidirectional transmission of the beacons between the device 1430 and the light fixtures 1410, 1411, 1412, 1413 provides for better accuracy in the determination of distances between the device 1430 and each of the light fixtures 1410, 1411, 1412, 1413. Further the bidirectional transmission of the beacons between the device 1430 and the light fixtures 1410, 1411, 1412, 1413 provides redundancy in information needed to determine distances between the device 1430 and the light fixtures 1410, 1411, 1412, 1413. For example, beacons may be transmitted from the light fixtures 1410, 1411, 1412, 1413 at a higher power level. Further, different wireless transmission protocols can be used in the uplink which is different from the transmission protocols used in the downlink.

At least some embodiments include adaptively determining which of the uplink and downlink beacons provide the better distance estimates, and adaptively calculating the distances accordingly. That is, one direction may be selected to be exclusively used for location determination, or the location determination may adaptively adjust how much of an influence either the uplink or downlink beacons have in the determination.

As shown, for an embodiment, the light fixtures 1410, 1411, 1412, 1413 are interfaced with a central of cloud controller or server 1475. For at least some embodiments, the distance calculations are at least partially performed by the cloud server 1475.

Although specific embodiments have been described and illustrated, the described embodiments are not to be limited to the specific forms or arrangements of parts so described and illustrated. The embodiments are limited only by the appended claims.

What is claimed:

1. A light fixture comprising:
a sensor unit and a light intensity controller; wherein
the sensor unit comprises;
a sensor, the sensor operative to generate a sense signal base on at least one of sensed motion or light;
communication circuitry, the communication circuitry operative to maintain a link with a network;
a controller, the controller operative to:
manage communication with the network;
manage reception of beacons through the wireless communication circuitry, wherein the beacons are received from a mobile object, and the beacons include information associated with the mobile object, and wherein the received beacons indicate whether acceleration of the mobile object has been sensed;
generate dimming control based on at least one of the sensed signal and communication from the network; and wherein
the light intensity controller is configured to receive the dimming control and operative to adjust an emitted light intensity of a luminaire of the light fixture.

2. The light fixture of claim 1, wherein the information associated with the mobile object includes at least one of a transmission power of the beacons, a unique ID of the mobile object, or remaining battery power of the mobile object.

3. The light fixture of claim 2, wherein the unique ID allows for filtering of received beacons.

4. The light fixture of claim 2, wherein the light fixture is operative to determine a received signal strength indicator (RSSI) of the received beacons, wherein the information associated with the mobile object includes at least transmission power of the beacons, and wherein the controller is operative to estimate a distance between the light fixture and the mobile object based on the RSSI of the received beacons and the transmission power of the beacons.

5. The light fixture of claim 1, wherein the information associated with the mobile object includes sensed motion of the mobile object.

6. The light fixture of claim 5, wherein the sensed motion includes sensed acceleration of the mobile object.

7. The light fixture of claim 6, wherein the sensed acceleration includes a magnitude and direction of acceleration of the mobile object along one or more directions.

8. The light fixture of claim 7, the controller is further operative to detect an orientation of the mobile object at rest and a direction a magnitude of movement of the mobile object based on the magnitude and direction of the acceleration of the mobile object along one or more directions.

9. The light fixture of claim 6, wherein the sensed acceleration of the mobile object influences a rate at which the mobile object transmits the beacons.

10. The light fixture of claim 1, wherein the information associated with the mobile object includes at least one of gyroscope data, magnetometer data, temperature data, air quality measurements.

11. The light fixture of claim 1, wherein the controller is operative to estimate a distance between the light fixture and the mobile object based on an RSSI of the received beacons and a transmission power of the beacons, and wherein at least one of the controller and another controller is operative to estimate a location of the mobile object based on the estimated distance.

12. The light fixture of claim 11, wherein estimating the location of the mobile object is further based on sensed motion data within the beacons.

13. The light fixture of claim 1, wherein the controller is further operative to sense motion, and wherein location of the mobile object is determined only after sensing the motion.

14. The light fixture of claim 1, wherein a power lever of transmission of the beacons from the mobile object is limited to below a threshold.

15. A method of operating a light fixture comprising:
generating, by a sensor of the light fixture, a sense signal base on at least one of sensed motion or light;
maintaining a communications link between the light fixture and a network;
managing communication with the network;
managing manage reception of beacons through the wireless communication circuitry, wherein the beacons are received from a mobile object, and the beacons include information associated with the mobile object, and wherein the received beacons indicate whether acceleration of the mobile object has been sensed;
generating dimming control base on at least one of the sensed signal and communication from the network; and
adjusting a dimming control line of a luminaire of the light fixture based on the dimming control.

16. The method of claim 15, wherein the information associated with the mobile object includes at least one of a transmission power of the beacons, a unique ID of the mobile object, or remaining battery power of the mobile object.

17. The method of claim 16, wherein the light fixture is operative to determine a received signal strength indicator (RSSI) of the received beacons, wherein the information associated with the mobile object includes at least transmission power of the beacons, and wherein the controller is operative to estimate a distance between the light fixture and the mobile object based on the RSSI of the received beacons and the transmission power of the beacons.

18. The method of claim 17, wherein the information associated with the mobile object includes sensed motion of the mobile object, wherein the sensed motion includes sensed acceleration of the mobile object.

19. The method of claim 18, wherein the sensed acceleration of the mobile object influences a rate at which the mobile object transmits the beacons.

20. The method of claim 15, further comprising estimating a distance between the light fixture and the mobile object based on an RSSI of the received beacons and a transmission power of the beacons, and estimating a location of the mobile object based on the estimated distance.

* * * * *